United States Patent [19]
Keller

[11] Patent Number: 6,043,994
[45] Date of Patent: Mar. 28, 2000

[54] POWER SUPPLY HAVING A TRANSFORMER FOR STANDBY MODE OPERATION

[75] Inventor: Anton Werner Keller, Arni, Switzerland

[73] Assignee: Thomson Licensing S.A., Boulogne, Cedex, France

[21] Appl. No.: 09/297,416

[22] PCT Filed: Nov. 13, 1997

[86] PCT No.: PCT/IB97/01430

§ 371 Date: Apr. 29, 1999

§ 102(e) Date: Apr. 29, 1999

[87] PCT Pub. No.: WO98/21885

PCT Pub. Date: May 22, 1998

[30] Foreign Application Priority Data

Nov. 13, 1996 [GB] United Kingdom .................... 9623612

[51] Int. Cl.[7] .................................................. H02M 3/335
[52] U.S. Cl. .................................................. 363/19
[58] Field of Search .................................. 348/739, 730; 455/343; 364/187; 363/19

[56] References Cited

U.S. PATENT DOCUMENTS

| | | | |
|---|---|---|---|
| 4,734,771 | 3/1988 | Lendaro et al. | 358/190 |
| 4,751,580 | 6/1988 | Fitzgerald et al. | 358/190 |
| 4,788,591 | 11/1988 | Decraemer | 358/190 |
| 5,175,441 | 12/1992 | Hollander | 307/43 |

FOREIGN PATENT DOCUMENTS 6-225529  8/1994  Japan .......................... 3/28

OTHER PUBLICATIONS

*Patent Abstracts of Japan, vol. 018, No. 595, Nov. 14, 1994 & JP 6-225529.
Siemens SMPS IC TDA 4605 Manual, "Function and Application of the Switch Mode Powersupply IC TDA 4605", Martin Feldkeller et al., Jul. 27, 1989, pp. 1–50.

*Primary Examiner*—Shawn Riley
*Attorney, Agent, or Firm*—Joseph S. Tripoli; Joseph J. Laks; Sammy S. Henig

[57] ABSTRACT

A power supply circuit for a video display apparatus having run and standby modes of operation. A resistor has a first terminal coupled to a power supply controller circuit for enabling operation of the power supply controller circuit. A standby mode power supply provides an output voltage for the video display apparatus during a standby mode of operation. The standby mode power supply utilizes a standby transformer having a secondary winding coupled to a second terminal of the resistor. The secondary winding provides a low voltage to the resistor to minimize the power dissipated by the resistor.

14 Claims, 3 Drawing Sheets

POWER SUPPLY HAVING A TRANSFORMER FOR STANDBY MODE OPERATION

BACKGROUND

1. Field of the Invention

This invention relates generally to the field of power supplies, and, in particular, to standby mode power supplies for television receivers.

2. Background Information

In a conventional power supply arrangement for a video display apparatus, a primary winding of a standby transformer is coupled to the AC mains. A transformed voltage across a secondary winding of the standby transformer is full-wave rectified and is regulated by some form of linear regulation to provide power for the video display apparatus in a standby mode of operation. This standby power supply consumes power as long as the video display apparatus is connected to the AC mains, and thus also consumes power during the run mode of operation.

A main, or run mode, power supply may have a control circuit which is responsive to a decoded on/off signal to energize the run mode power supply during the run mode of operation and to de-energize the run mode power supply during the standby mode of operation. A typical switched mode power supply control IC normally has a start-up resistor connected to its supply voltage pin. The other terminal of the start-up resistor may be coupled either to the AC mains voltage or to a rectified mains voltage. The control IC needs to draw a current through the start-up resistor until an internal reference voltage is established within the control IC.

Disadvantageously, however, the control IC continues to draw current through the start-up resistor even after the internal reference voltage within the control IC has been established. This presents a problem because of the contribution by the power dissipated in the start-up resistor to the power consumed by the video display apparatus in the standby mode of operation.

The power consumed by electronic equipment in the standby mode is becoming an increasingly visible public policy issue. For example, an article in the Sep. 19, 1997, issue of *Europe Energy* reports that the European Commission regards reducing the energy consumed by electronic equipment in the standby mode of operation as a priority. The article further states that the Commission has concentrated its initial efforts at reducing the standby power consumption of televisions and VCRs, and that it has elicited voluntary commitments from manufacturers of such products to progressively reduce average standby power consumption to less than three watts.

It is therefore advantageous to reduce the power dissipated in the start-up resistor as one contribution toward the goal of reducing the power consumed by a video display apparatus, or other electronic equipment. Furthermore, as the standby power consumption is gradually reduced, it becomes even more advantageous to reduce the power dissipated by the start-up resistor because the power dissipated in the start-up resistor gradually becomes a greater percentage of the power consumed in the standby mode.

It is therefore desirable to provide a simple and cost-effective method for reducing the standby power consumption attributable to the start-up resistor of the switched mode power supply controller IC.

SUMMARY

The present invention is directed to a power supply circuit that reduces the standby consumption attributable to the start-up resistor of a switched mode power supply controller circuit. A power supply circuit for a video display apparatus having run an d standby modes of operation, the power supply circuit comprising: a power supply controller circuit; a resistor having a first terminal coupled to the power supply controller circuit for enabling operation of the power supply controller circuit; and a standby mode power supply for providing an output voltage for the video display apparatus during a standby mode of operation; the standby mode power supply comprising a standby transformer having a secondary winding coupled to a second terminal of the resistor.

The above, and other features, aspects, and advantages of the present invention will become apparent from the following description read in conjunction with the accompanying drawings, in which like reference numerals designate the same elements.

DESCRIPTION OF THE PREFERRED EMBODIMENTS

Figure 1:
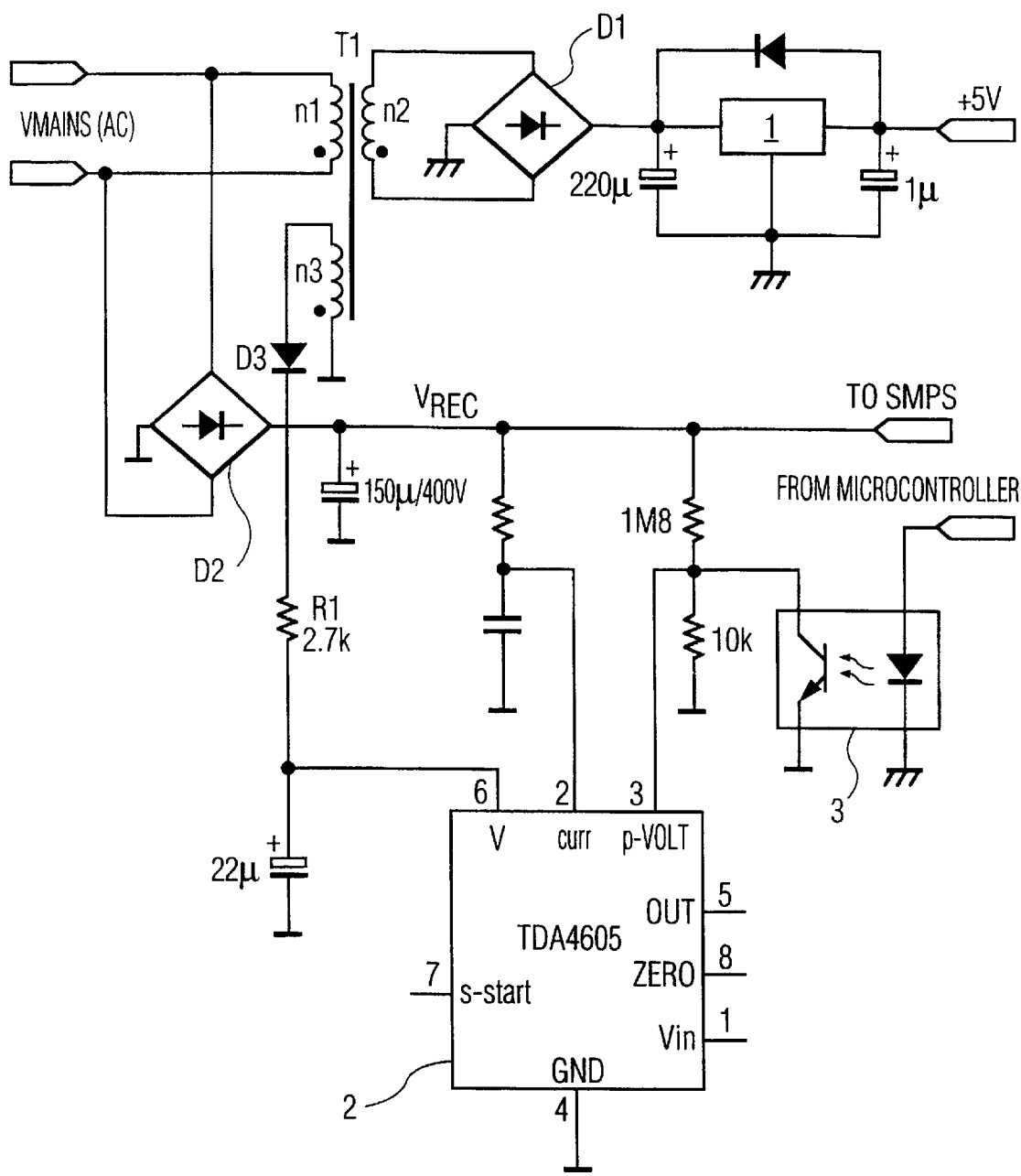
FIGS. 1–3 show schematic diagrams of standby power supplies that embody the present invention.

A standby power supply 10 shown in FIG. 1. A mains voltage $V_{MAINS}$ is coupled from a primary winding n1 of a standby transformer T1 to a secondary winding n2. The transformed voltage across the secondary winding n2 is rectified by the bridge rectifier D1 and applied to the input of a voltage regulator 1, which provides a standby voltage, for example +5 V.

The mains voltage $V_{MAINS}$ is also rectified by a bridge rectifier D2 to provide the rectified voltage $V_{REC}$ to the main, or run, switched mode power supply (not shown). The run power supply is controlled by the switched mode power supply controller circuit 2.

The optocoupler 3, rather than a relay, is used to turn off the run power supply during the standby mode of operation. In the standby mode, the light-emitting diode of the optocoupler 3 conducts a current equal to approximately two milliamps. The transistor of the optocoupler thus turns on and couples pin 3 of the switched mode power supply controller circuit 2 to a ground, or reference, potential, thereby turning off the switched mode power supply controller circuit 20 turns off. The switched mode power supply controller circuit 2 may comprise, for example, a TDA4605 power supply controller integrated circuit manufactured by Siemens Aktiengesellschaft.

A first terminal of the start-up resistor R1 is coupled to the switched mode power supply controller circuit 2. The standby transformer T1 advantageously utilizes a secondary winding n3 for feeding a voltage through the diode D3 to the other terminal of the start-up resistor R1. The secondary winding n3 applies a low voltage to the start-up resistor R1, thereby reducing the power dissipated in the start-up resistor R1. In the embodiment shown in FIG. 1, with the secondary winding n3 applying a +20 V to the start-up resistor R1, the power dissipation by the start-up resistor R1 may be as low as 100 mW during standby operation.

Figure 2:
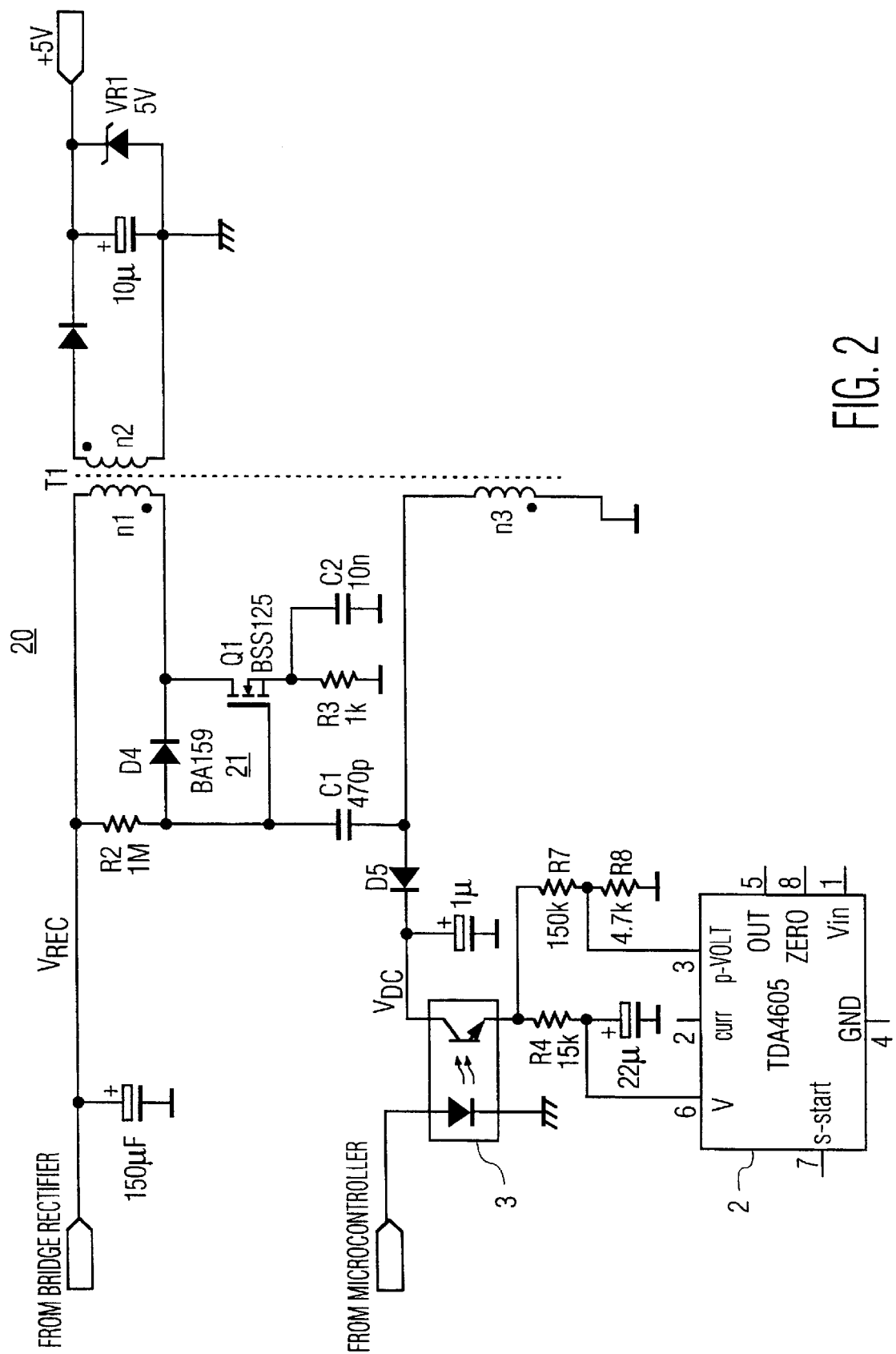

In FIG. 2, a standby power supply 20 provides power to the microcontroller (not shown) during both standby and run modes of operation. A free-running oscillator circuit 21 includes the primary winding n1 and is used in conjunction with said secondary winding n3 of the standby transformer T1 to further reduce power consumption in the standby mode of operation. The free-running oscillator illustrated in FIG. 2 is a blocking oscillator circuit, which is formed by the standby transformer T1; resistors R2 and R3; the capacitors C1 and C2; the diode D4; and the transistor Q1. The blocking oscillator 21 operates in a conventional manner and will not be described further herein. The depiction of a blocking oscillator circuit in FIG. 2 is merely exemplary and does not proscribe the use of other oscillator circuits or topologies in the context of the present invention.

The blocking oscillator 21 runs with an almost constant frequency that is dependent upon the mains voltage. The duty cycle of the oscillation is also substantially constant, so that the energy transferred to the secondary winding n2 is substantially constant. This substantially constant energy transfer has two consequences. First, the standby power supply 20 is inherently protected against a short circuit condition on the secondary side of the standby transformer T1. Second, parallel voltage regulation techniques can be used to regulate the voltages provided by the secondary windings of the standby transformer T1. For example, in FIG. 2, the +5 V output provided by the secondary winding n2 can be regulated by the Zener diode VR1. The use of the Zener diode VR1 is merely illustrative and does not exclude the applicability of other parallel voltage regulation techniques in the context of the present invention.

In the embodiment shown in FIG. 2, the frequency of operation of the blocking oscillator 21 is equal to approximately 100 kHz. The blocking oscillator 21 is advantageously used to transform the relatively low mains frequency, for example 50 or 60 Hz, to a higher frequency. This transformation permits a decrease in the size of the standby transformer T1, which, in turn, leads to decrease in the standby power consumption attributable to the standby transformer T1.

The voltage across the secondary winding n3 is rectified by the diode D5 to provide a DC voltage $V_{DC}$ for the start-up resistor R4 and for the voltage divider formed by the resistors R7 and R8. In the embodiment shown in FIG. 2, the DC voltage $V_{DC}$ is equal to approximately +32 V. It should be noted that the DC voltage $V_{DC}$ tracks the magnitude of the rectified mains voltage $V_{REC}$ such that the ratio of the magnitude of the rectified mains voltage $V_{REC}$ to the DC voltage $V_{DC}$ is maintained constant as the ratio of the number of turns of the primary winding n1 to the number of turns of the secondary winding n3. The optocoupler 3 couples the DC voltage $V_{DC}$ to the start-up resistor R4 and to the switched mode power supply controller circuit 2 during the run mode of operation.

In the standby power supply 20, the standby transformer T1 may be constructed using an EF16, N67 core with no air gap. The inductance of the primary winding of the standby transformer T1 may be equal to approximately 100 mH. Approximately 5 layers of 0.1 mm thickness MYLAR® brand polymeric film may be used to provide electrical isolation between the primary winding n1 and the secondary windings n2 and n3. The respective turns ratios may be as follows: n1/n3=10; and n1/n2=12.

Figure 3:
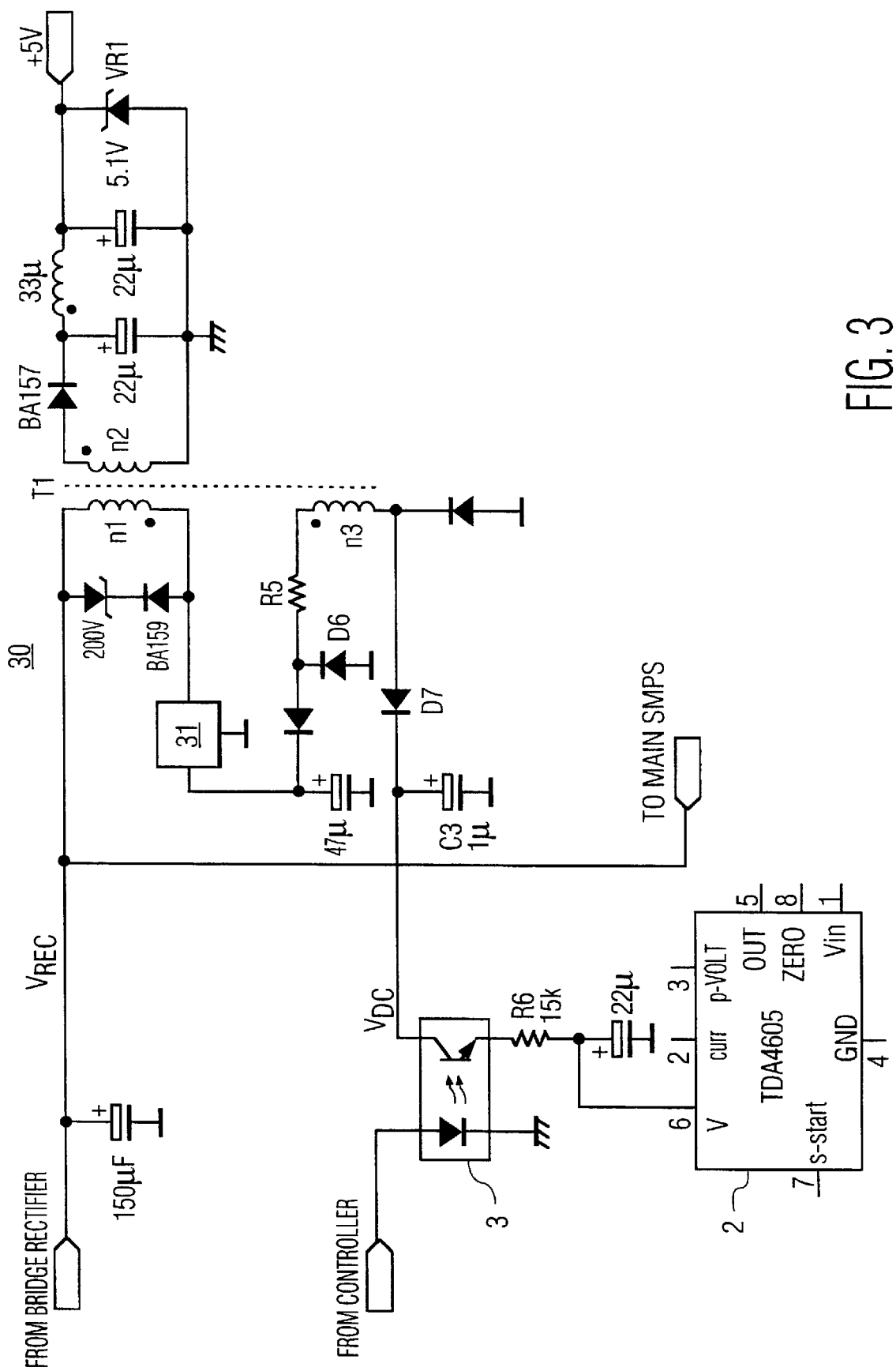

In FIG. 3, a standby power supply 30 is implemented using a TOPSwitch® TOP-210 three-terminal, off-line, pulse width modulator switch 31, the use of which is well-known to those having ordinary skill in the art.

The capacitor C3 is charged to a voltage $V_{DC}$ by a current flowing through the diodes D6 and D7; the resistor R5; and the secondary winding n3. In the embodiment of FIG. 3, the voltage $V_{DC}$ is equal to approximately +32 V. The voltage $V_{DC}$ is coupled by the optocoupler 3 to the start-up resistor R6 and to the switched mode power supply controller circuit 2 during the run mode of operation.

In the standby power supply 30, the standby transformer T1 may be constructed using an EF16, N67 core with an air gap equal to approximately 0.1 mm. The inductance of the primary winding of the standby transformer T1 may be equal to approximately 6 mH, using approximately 160 turns, in two layers, of 0.1 mm diameter CuL wire. Approximately one layer of 0.1 mm thickness MYLAR® brand polymeric film may be used to provide electrical isolation between the two layers of wire to reduce parasitic capacitance. The secondary winding n2 may use 13 turns of 0.315 mm diameter CuL wire, and the secondary winding n3 may use 16 turns of 0.315 mm diameter wire. Approximately 2 layers of 0.1 mm thickness MYLAR® brand polymeric film may be used to provide electrical isolation between the primary winding n1 and the secondary windings n2 and n3.

It will be apparent to those skilled in the art that, although the invention has been described in terms of specific examples, modifications and changes may be made to the disclosed embodiments without departing from the essence of the invention. Accordingly, reference should be made to the appended claims, rather than to the foregoing specification, as indicating the true scope of the invention.

I claim:

1. A power supply circuit for a video display apparatus having run and standby modes of operation, switched mode power supply circuit comprising:

a power supply controller circuit;

a resistor having a first terminal coupled to said power supply controller circuit for enabling operation of said power supply controller circuit;

a standby transformer having a secondary winding coupled to a second terminal of said resistor; and a free-running oscillator circuit for energizing said transformer.

2. The power supply circuit of claim 1, wherein a secondary winding of said standby transformer is coupled to a second terminal of said resistor.

3. The power supply circuit of claim 2, wherein said secondary winding provides a DC voltage to said resistor.

4. The power supply circuit of claim 3, wherein said DC voltage tracks a magnitude of a rectified mains voltage.

5. The power supply circuit of claim 3, wherein said DC voltage tracks said magnitude of said rectified mains voltage such that a ratio of said magnitude of said rectified mains voltage to said DC voltage is maintained constant as the ratio of the number of turns of a primary winding to the number of turns of said secondary winding.

6. The power supply circuit of claim 1, wherein said free-running oscillator circuit oscillates with a substantially constant frequency.

7. The power supply circuit of claim 6, wherein said substantially constant frequency is dependent upon on a mains voltage.

8. The power supply circuit of claim 7, wherein a duty cycle of an output of said free-running oscillator circuit is substantially constant.

9. The power supply circuit of claim 8, wherein energy transferred from a primary winding of said standby transformer to a secondary winding is substantially constant.

10. The power supply circuit of claim 9, wherein said power supply circuit is inherently protected against a short circuit condition at said secondary winding of said standby transformer.

11. The power supply circuit of claim 10, wherein a voltage provided by said secondary winding is capable of being regulated by a parallel voltage regulation technique.

12. The power supply circuit of claim 11, wherein said parallel voltage regulation technique comprises a Zener diode.

13. The power supply circuit of claim 11, wherein said free-running oscillator circuit comprises a blocking oscillator.

14. The power supply circuit of claim 13, wherein said blocking oscillator circuit comprises:

a transistor having a drain electrode coupled to a primary winding of said standby transformer;

a first capacitor coupled at a first terminal to a gate electrode of said transistor and coupled at a second terminal to said secondary winding;

a diode having an anode coupled to said gate electrode of said transistor and a cathode coupled to said drain electrode;

a resistor coupled to a source electrode of said transistor; and a capacitor coupled in parallel with said resistor.

* * * * *